US007608945B2

(12) United States Patent
Sun

(10) Patent No.: US 7,608,945 B2
(45) Date of Patent: Oct. 27, 2009

(54) APPARATUS FOR CONTROLLING POWER SUPPLY TO ELECTRONIC DEVICES

(75) Inventor: Ke Sun, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 181 days.

(21) Appl. No.: 11/309,792

(22) Filed: Sep. 28, 2006

(65) Prior Publication Data

US 2007/0139867 A1 Jun. 21, 2007

(30) Foreign Application Priority Data

Dec. 2, 2005 (CN) .................... 2005 2 0119857 U

(51) Int. Cl.
*H02J 1/00* (2006.01)

(52) U.S. Cl. ........................................................ 307/71

(58) Field of Classification Search ................. 307/114, 307/117, 71; 315/291
See application file for complete search history.

(56) References Cited

U.S. PATENT DOCUMENTS

| | | | | |
|---|---|---|---|---|
| 3,991,320 | A * | 11/1976 | Ross | 307/71 |
| 4,215,277 | A * | 7/1980 | Weiner et al. | 307/41 |
| 5,294,838 | A * | 3/1994 | Juravich | 307/117 |
| 5,708,554 | A * | 1/1998 | Liner | 361/104 |
| 6,184,671 | B1 | 2/2001 | Han et al. | |
| 6,946,805 | B2 * | 9/2005 | Segan et al. | 315/291 |
| 7,102,301 | B2 * | 9/2006 | Oskorep et al. | 315/362 |
| 2001/0030470 | A1 * | 10/2001 | Waugh et al. | 307/114 |

* cited by examiner

*Primary Examiner*—Adolf Berhane
(74) *Attorney, Agent, or Firm*—Wei Te Chung

(57) ABSTRACT

An apparatus for controlling a power supply includes a plug, a plurality of electrical outlets, a communication interface, an encoder, and a selecting circuit. The selecting circuit is electrically coupled between the electrical outlets and the plug. The encoder receives a control signal via the communication interface and outputs a selecting signal to the selecting circuit. The selecting circuit controls connections between the electrical outlets and the plug via the selecting signal.

10 Claims, 3 Drawing Sheets

150
Vcc
D1
R1
R2
Q
VCC
Q0
Q1
Q2
Q3
Q4
Q5
Q6
140
D0
D1
D2
D3
D4
D5
D6
GND
130
L
N
E
110
K
S
D2
120
122

APPARATUS FOR CONTROLLING POWER SUPPLY TO ELECTRONIC DEVICES

FIELD OF THE INVENTION

The present invention relates to an apparatus for controlling a power supply, and particularly to an apparatus which can safely, conveniently control a power supply to supply power to a device.

DESCRIPTION OF RELATED ART

Generally speaking, when designing or testing electronic devices such as servers, power supply sources of the electronic devices need to switch between on and off frequently, and a typical method is to directly insert and pull out plugs of the power supply source. However, this method is not safe for users, and unduly laborious and time-consuming.

What is desired, therefore, is to provide an apparatus which can safely, conveniently control a power supply to supply power to electronic devices.

SUMMARY OF THE INVENTION

An exemplary apparatus for controlling a power supply includes a plug, a plurality of electrical outlets, a communication interface, an encoder, and a selecting circuit. The selecting circuit is electrically coupled between the electrical outlets and the plug. The encoder receives a control signal via the communication interface and outputs a selecting signal to the selecting circuit. The selecting circuit controls connections between the electrical outlets and the plug via the selecting signal.

Other advantages and novel features will become more apparent from the following detailed description when taken in conjunction with the accompanying drawings, in which:

DETAILED DESCRIPTION OF THE INVENTION

Figure 1:
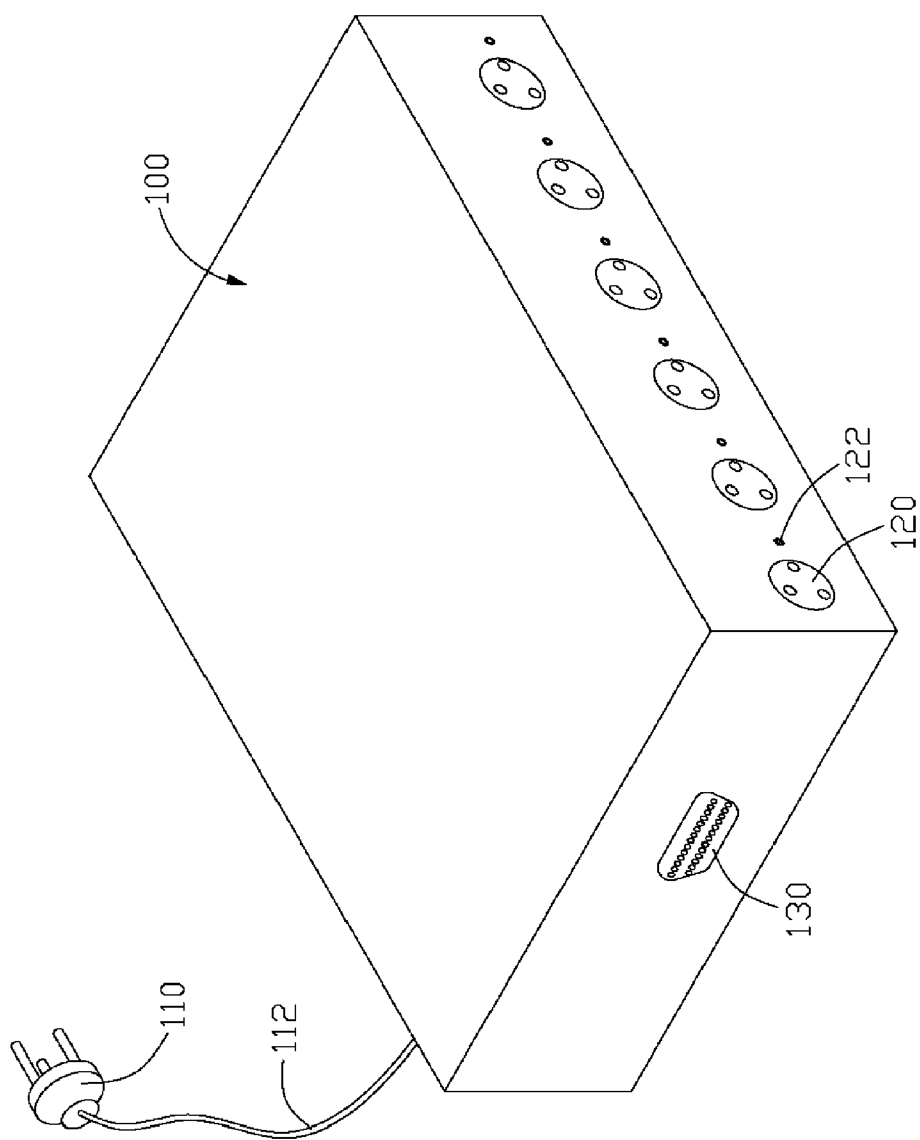
FIG. 1 is an isometric, schematic view of a power supply control apparatus in accordance with a preferred embodiment of the present invention.
Figure 2:
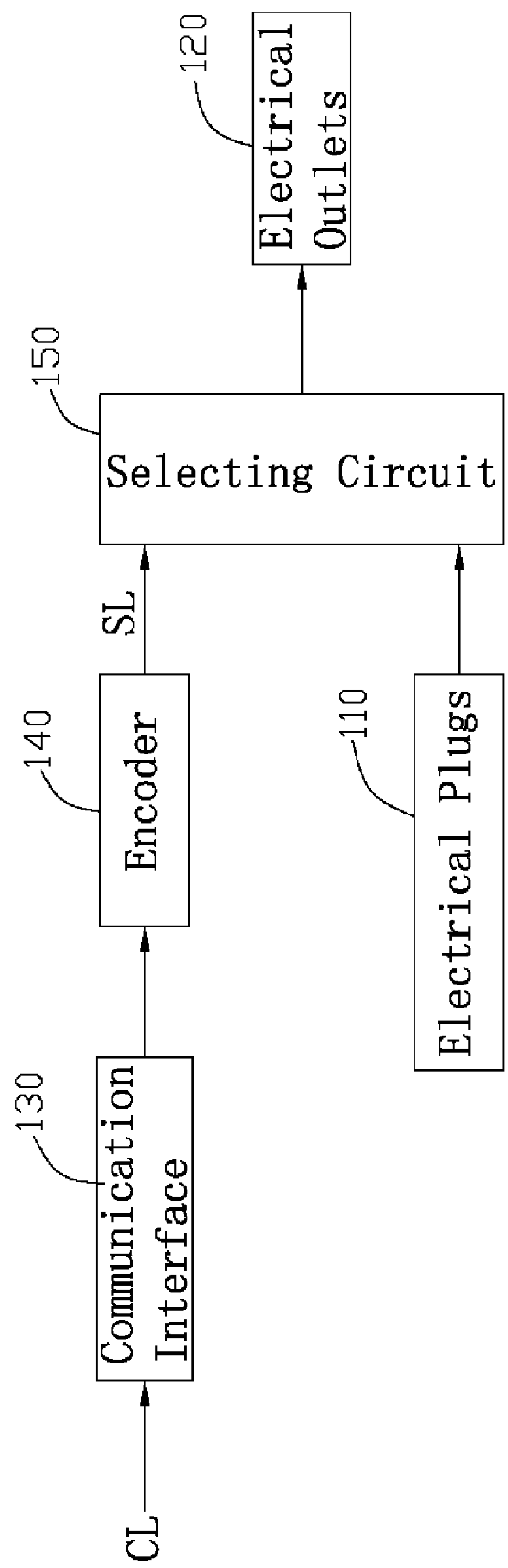
FIG. 2 is a block diagram of FIG. 1.

Referring to FIGS. 1 and 2, a power supply control apparatus in accordance with a preferred embodiment of the present invention includes a box 100, a plug 110 connected to the box 100 via a power cable 112. A plurality of electrical outlets 120, a plurality of indicators 122 each corresponding to one of the electrical outlets 120, and a communication interface 130, such as a serial interface, are installed on an exterior of the box 100. An encoder 140 and a selecting circuit 150 are installed in the box 100.

The communication interface 130 is electrically coupled to an input terminal of the encoder 140. An output terminal of the encoder 140 is electrically coupled to the selecting circuit 150. The encoder 140 receives a control signal CL via the communication interface 130. The control signal CL is converted to a selecting signal SL by the encoder 140, and the selecting signal SL is input to the selecting circuit 150. The selecting circuit 150 is electrically coupled between the electrical outlets 120 and the plug 110, and controls connections between the electrical outlets 120 and the plug 110 via the selecting signal SL.

Figure 3:
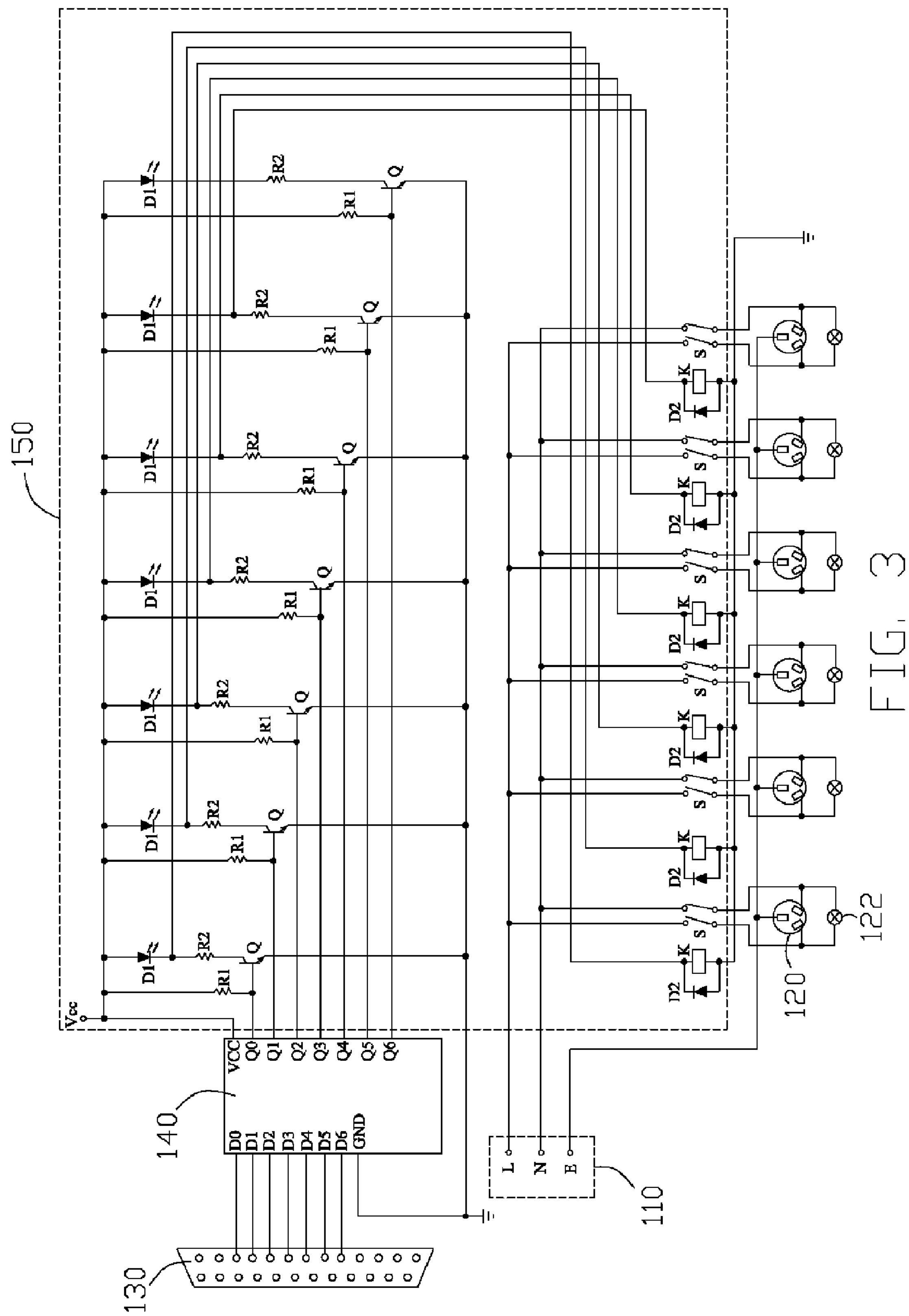
FIG. 3 is a circuit diagram of FIG. 1.

Referring also to FIG. 3. The selecting circuit 150 includes a power supply source Vcc, a plurality of switches S, a plurality of transistors Q, and a plurality of relays K. Bases of the transistors Q are correspondingly coupled to output pins of the output terminal of the encoder 140, emitters of the transistors Q are all grounded, and collectors of the transistors Q are all connected to the power supply source Vcc. The collector of each transistor Q is also connected to an end of a corresponding one of the relays K, the other end of each relay K is grounded. Each electrical outlet 120 is electrically connected to the plug 110 via a corresponding one of the switches S, and each relay K controls a corresponding one of the switches S.

In this embodiment, the selecting circuit 150 further includes a plurality of first resistors R1, a plurality of second resistors R2, a plurality of light-emitting diodes (LEDs) D1, and a plurality of diodes D2. Each first resistor R1 is connected between the base of a corresponding one of the transistors Q and the power supply source Vcc. Each second resistor R2 and a corresponding one of the LEDs D1 are connected in series between the collector of a corresponding one of the transistors Q and the power supply source Vcc. An anode of each LED D1 is connected to the power supply source Vcc, and a cathode of each LED D1 is connected to an end of a corresponding one of the second resistors R2 for detecting connection thereof. Each diode D2 is reverse biased and connected to a corresponding one of the relays K in parallel for protecting the corresponding relay K. Each indicator 122 is connected to a corresponding one of the electrical outlets 120 in parallel for showing power status of the electrical outlets 120.

In use, the power supply control apparatus is connected to an external power supply (not shown) such as a 220V alternating current (AC) power source via the plug 110. Electronic devices such as servers (not shown) are connected to the electrical outlets 120 of the power supply control apparatus. In this embodiment, an amount of the electrical outlets 120 is six, the amount thereof can be arranged according to need. The control signal CL is provided by a programmable device (not shown), such as a computer, a programmable logic controller (PLC), etc., electrically coupled to the communication interface 130. The control signal CL is transmitted to the encoder 140 via the communication interface 130 and is then converted to the selecting signal SL. The encoder 140 will directly send the selecting signal SL to the selecting circuit 150.

The programmable device controls power status of the electrical outlets 120. For example, when two electronic devices plugged into two of the electrical outlets 120 need to be energized, the programmable device sends a corresponding control signal CL to the encoder 140, and the control signal CL is converted to a corresponding selecting signal SL by the encoder 140. According to the selecting signal SL, voltage levels of the bases of the transistors Q corresponding to the two electrical outlets 120 become low, while voltage levels of the bases of the transistors Q corresponding to other electrical outlets 120 remain high. Therefore, only the transistors Q corresponding to the two electrical outlets 120 are turned off, and the relays K corresponding to the two electrical outlets 120 will work and control the corresponding switches S to be turned on so that the two electrical outlets 120 are electrically connected to the plug 110, namely the two electrical outlets 120 are supplied with power from the external power supply, but other electrical outlets 120 have no power. If other electrical outlets 120 need to be energized by the external power supply, the programmable device will input corresponding control signals CL. The power supply control apparatus can conveniently control the external power source to supply power to the electronic devices.

It is to be understood, however, that even though numerous characteristics and advantages of the preferred embodiments have been set forth in the foregoing description, together with details of the structures and functions of the embodiments, the disclosure is illustrative only, and changes may be made in detail, especially in matters of shape, size, equivalent material and arrangement of parts within the principles of the invention to the full extent indicated by the broad general meaning of the terms in which the appended claims are expressed.

What is claimed is:

1. An apparatus for controlling a power supply, comprising:

a plug adapted to be connected to a power source;

a plurality of electrical outlets;

a communication interface;

a programmable device configured for outputting a control signal;

an encoder receiving the control signal via the communication interface and converting the control signal to a selecting signal, and then outputting the selecting signal; and a selecting circuit electrically coupled between the electrical outlets and the plug, the selecting circuit receiving the selecting signal to control the plug to selectively connect to one or more electrical outlets to be needed;

wherein the selecting circuit includes a power supply source, a plurality of switches, a plurality of transistors, and a plurality of relays, bases of the transistors are correspondingly coupled to output pins of the encoder, emitters of the transistors are grounded, collectors of the transistors are connected to the power supply source, the collector of each of the transistors is connected to an end of a corresponding one of the relays, another end of each of the relays is grounded, each of the electrical outlets is electrically connected to the plug via a corresponding one of the switches, and each of the relays controls a corresponding one of the switches.

2. The apparatus as claimed in claim 1, wherein the selecting circuit further includes a plurality of first resistors, each of the first resistors is connected between the base of a corresponding one of the transistors and the power supply source.

3. The apparatus as claimed in claim 1, wherein the selecting circuit further includes a plurality of second resistors, each of the second resistors is connected between the collector of a corresponding one of the transistors and the power supply source.

4. The apparatus as claimed in claim 1, wherein the selecting circuit further includes a plurality of light-emitting diodes (LEDs), each of the LEDs is connected between the collector of a corresponding one of the transistors and the power supply source.

5. The apparatus as claimed in claim 1, wherein the selecting circuit further includes a plurality of diodes, each of the diodes is reverse biased and connected to a corresponding one of the relays in parallel.

6. The apparatus as claimed in claim 1, further including a plurality of indicators, each of the indicators is connected to a corresponding one of the electrical outlets in parallel.

7. The apparatus as claimed in claim 1, wherein the communication interface is a serial interface.

8. An apparatus for controlling power supply to electronic devices, comprising:

a plug adapted to be connected to a power source;

a plurality of electrical outlets configured for coupling to the electronic devices respectively;

a communication interface electrically coupled between a programmable device and an encoder; and a selecting circuit electrically coupled between the plug and the electrical outlets, the encoder receiving a control signal from the programmable device via the communication interface, and according to the control signal outputting a selecting signal to the selecting circuit, the selecting circuit selecting one or any combination of electrical outlets to be electrically connected to the plug according to the selecting signal;

wherein the selecting circuit includes a power supply source, a plurality of switches, a plurality of transistors, and a plurality of relays, bases of the transistors are correspondingly coupled to output pins of the communication interface, emitters of the transistors are grounded, collectors of the transistors are connected to the power supply source, the collector of each of the transistors is connected to an end of a corresponding one of the relays, another end of each of the relays is grounded, each of the electrical outlets is electrically connected to the plug via a corresponding one of the switches, and each of the relays controls a corresponding one of the switches.

9. The apparatus as claimed in claim 8, wherein the selecting circuit further includes a plurality of first resistors, each of the first resistors is connected between the base of a corresponding one of the transistors and the power supply source.

10. The apparatus as claimed in claim 8, wherein the selecting circuit further includes a plurality of diodes, each of the diodes is reverse biased and connected to a corresponding one of the relays in parallel.

* * * * *

UNITED STATES PATENT AND TRADEMARK OFFICE

CERTIFICATE OF CORRECTION

PATENT NO. : 7,608,945 B2
APPLICATION NO. : 11/309792
DATED : October 27, 2009
INVENTOR(S) : Ke Sun It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 210 days.

Signed and Sealed this

Twelfth Day of October, 2010

David J. Kappos

*Director of the United States Patent and Trademark Office*